United States Patent
Jiang et al.

(10) Patent No.: US 11,300,955 B2
(45) Date of Patent: Apr. 12, 2022

(54) METHOD FOR DETERMINING RIDE STABILITY OF AN AUTONOMOUS DRIVING SYSTEM CONTROLLING AN AUTONOMOUS DRIVING VEHICLE

(71) Applicant: Baidu USA LLC, Sunnyvale, CA (US)

(72) Inventors: Yifei Jiang, Sunnyvale, CA (US); Jinyun Zhou, Sunnyvale, CA (US); Jiacheng Pan, Sunnyvale, CA (US); Jiaxuan Xu, Sunnyvale, CA (US); Hongyi Sun, Sunnyvale, CA (US); Jiaming Tao, Sunnyvale, CA (US); Shu Jiang, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 191 days.

(21) Appl. No.: 16/712,429

(22) Filed: Dec. 12, 2019

(65) Prior Publication Data
US 2021/0181738 A1 Jun. 17, 2021

(51) Int. Cl.
*G05D 1/00* (2006.01)
*B60W 30/182* (2020.01)
*B60W 40/09* (2012.01)
*G06F 16/22* (2019.01)
*G06T 7/35* (2017.01)

(52) U.S. Cl.
CPC .......... *G05D 1/0061* (2013.01); *B60W 30/182* (2013.01); *B60W 40/09* (2013.01); *G05D 1/0088* (2013.01); *G06F 16/2282* (2019.01); *G06T 7/35* (2017.01)

(58) Field of Classification Search
CPC ...... G05D 1/0061; G05D 1/0088; G06T 7/35; G06F 16/2282; B60W 30/182; B60W 40/09
See application file for complete search history.

(56) References Cited

U.S. PATENT DOCUMENTS

| | | | |
|---|---|---|---|
| 2018/0143648 A1* | 5/2018 | Kim | G05D 1/0088 |
| 2019/0220011 A1* | 7/2019 | Della Penna | G06F 8/65 |
| 2020/0145287 A1* | 5/2020 | Savalle | H04L 41/0813 |

* cited by examiner

*Primary Examiner* — Ramsey Refai
(74) *Attorney, Agent, or Firm* — Womble Bond Dickinson (US) LLP

(57) ABSTRACT

In one embodiment, a set of predetermined driving parameters is determined from a set of driving statistics data collected from a number of vehicles, which may be driven by human drivers. For each pair of the predetermined driving parameters, a distribution of the pair of driving parameters is plotted based on their relationship on a two-dimensional (2D) distribution space. The 2D distribution space is partitioned into a number of grid cells, each grid cell representing a particular pair of driving parameters. For each of the grid cells, a probability is calculated that the pair of driving parameter likely falls in the grid cell. A grid table is generated corresponding to the pair of driving parameters. The grid table can be utilized during the autonomous driving at real-time or during simulation to determine a ride stability of an autonomous driving vehicle (ADV) in view of the pair of driving parameters.

22 Claims, 11 Drawing Sheets

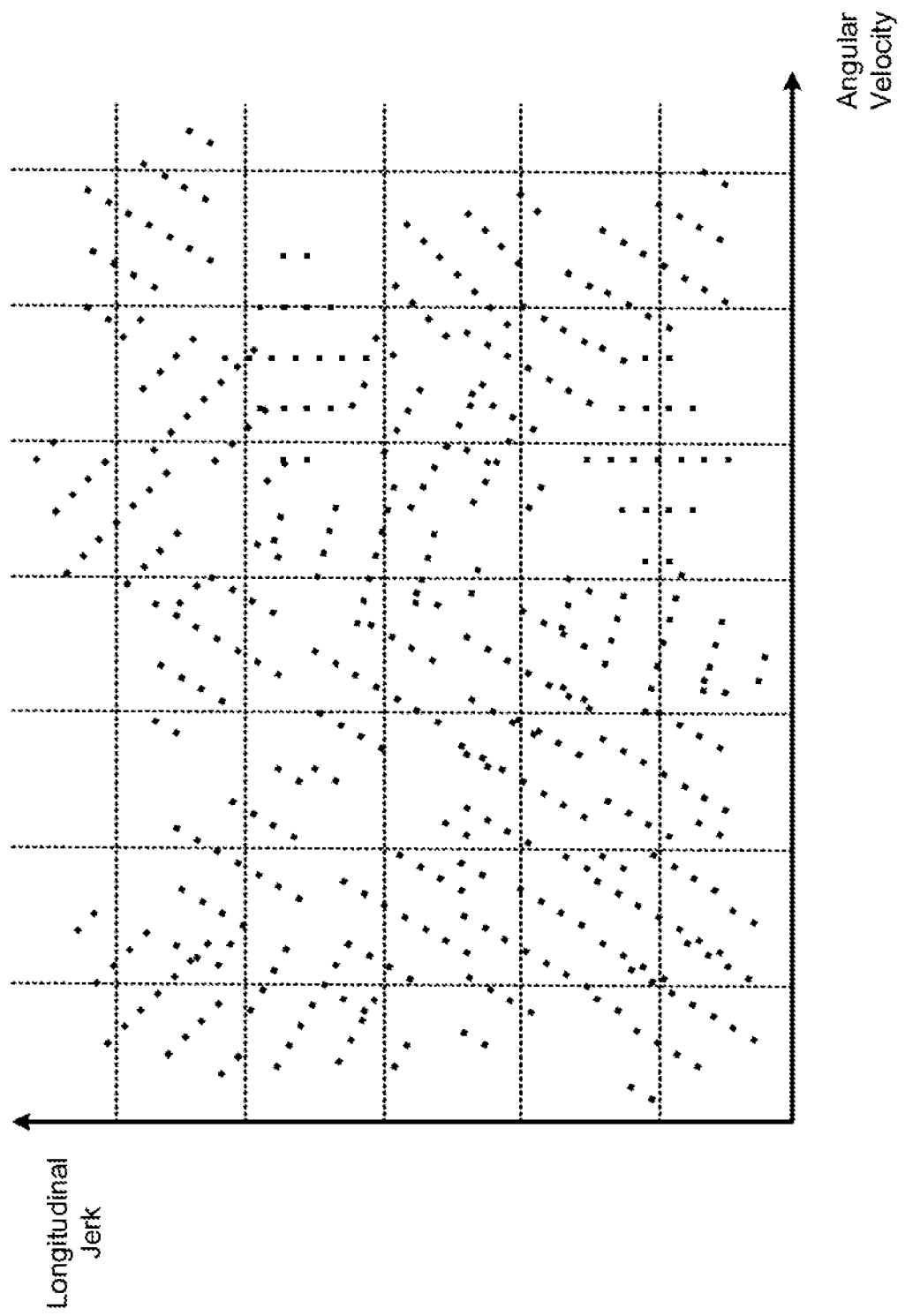

| Grid ID | Longitudinal Jerk | Angular Velocity | Probability |
|---------|-------------------|------------------|-------------|
| ... | ... | ... | ... |
| 401 | 402 | 403 | 404 |

METHOD FOR DETERMINING RIDE STABILITY OF AN AUTONOMOUS DRIVING SYSTEM CONTROLLING AN AUTONOMOUS DRIVING VEHICLE

TECHNICAL FIELD

Embodiments of the present disclosure relate generally to operating autonomous driving vehicles. More particularly, embodiments of the disclosure relate to determining ride stability of an autonomous driving system.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Ride stability is an important evaluation metric to measure the performance of autonomous driving. The metrics is used not only for guiding the technology development but also improving the development efficiency. With an accurate metrics measurement, one can develop autonomous driving technology through simulation instead of road testing. Simulation based development will make the technology cycles more efficient.

Measuring ride stability is a difficult task because ride stability is a subjective measurement and may be graded differently by different people. Ride stability ca be affected by many measures, such as, speed, acceleration, jerk, curvature, derivative of curvature, etc. Bad ride stability data is not easy to collect as it happened rare and difficult to mimic.

BRIEF DESCRIPTION OF THE DRAWINGS

Embodiments of the disclosure are illustrated by way of example and not limitation in the figures of the accompanying drawings in which like references indicate similar elements.

FIGS. 3A and 3B are diagram illustrating an example of a distribution graph of driving parameters according to one embodiment.

FIG. 4 is a block diagram illustrating an example of a grid table according to one embodiment.

DETAILED DESCRIPTION

Figure 1:
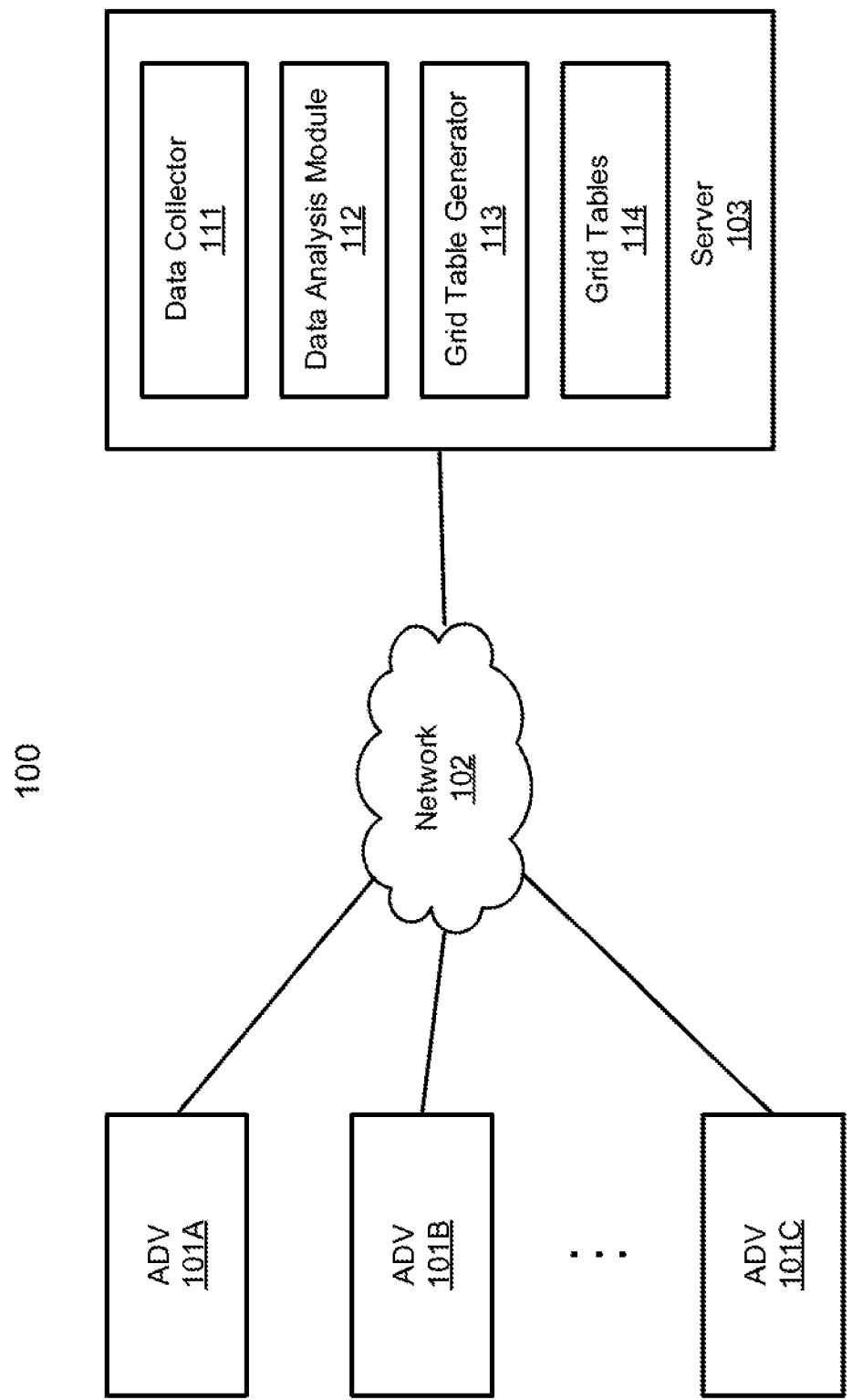
FIG. 1 is a block diagram illustrating a network configuration for generating grid tables for determining ride stability according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a new approach is utilized to generate ride stability scores based on human driving data. The approach first collects a set of human driving data and use the human driving data to build a ride stability metrics such as a ride stability probability table. Subsequently, during the evaluation phase, processing logic performs a lookup in the ride stability measurement metrics to determine the ride stability score for each data point or a period of driving data. The measurement infrastructure includes an offline portion and an online portion. The offline phase produces a ride stability measurement or scoring metrics based on a large amount of human driving data. Once ride stability measuring metrics have been generated, it can be used online for measuring the ride stability based on driving data collected at real-time or during simulation of an autonomous driving system.

According to one aspect, a set of predetermined driving parameters is determined from a set of driving statistics data collected from a number of vehicles, which may be driven by human drivers. For each pair of the predetermined driving parameters, a distribution of the pair of driving parameters is plotted based on their relationship on a two-dimensional (2D) distribution space. The 2D distribution space is partitioned into a number of grid cells, each grid cell representing a particular pair of driving parameters. For each of the grid cells, a probability is calculated that the pair of driving parameter likely falls in the grid cell. A grid table is generated corresponding to the pair of driving parameters. The grid table can be utilized during the autonomous driving at real-time or during simulation to determine a ride stability of an autonomous driving vehicle (ADV) in view of the pair of driving parameters.

In one embodiment, the grid table includes a number of mapping entries. Each mapping entry maps a gird cell identifier (ID) identifying a particular grid cell to a probability representing a likelihood that a driving parameter associated with a particular category of driving statistics of data falls into that particular grid cell. The categories of driving statistics data include at least one of a speed, an acceleration, a changing rate of an acceleration (also referred to as a jerk), a curvature, or a changing rate of a curvature.

The set of driving parameters includes at least one of an angular velocity, an angular acceleration, a longitudinal jerk, or a lateral jerk.

In one embodiment, the grid table includes a longitudinal jerk and angular velocity (longitudinal jerk-angular velocity) table having a plurality of mapping entries, each mapping entry mapping a particular pair of a longitudinal jerk and angular velocity to a particular probability. In another embodiment, the grid table includes a lateral jerk and angular velocity (lateral jerk-angular velocity) table having a plurality of mapping entries, each mapping entry mapping a particular pair of a lateral jerk and angular velocity to a particular probability. In a further embodiment, the grid table includes a longitudinal jerk and angular acceleration (longitudinal jerk-angular acceleration) table having a plurality of mapping entries, each mapping entry mapping a particular pair of a longitudinal jerk and angular acceleration to a particular probability. In another embodiment, the grid table includes a lateral jerk and angular acceleration (lateral jerk-angular acceleration) table having a plurality of mapping entries, each mapping entry mapping a particular pair of a lateral jerk and angular acceleration to a particular probability.

According to another aspect, a set of driving parameters is determined from driving statistics data collected from an autonomous driving vehicle (ADV) or from an autonomous simulation system. For each pair of the driving parameters, a lookup operation is performed based on the pair of driving parameters in a grid table associated with the pair of driving parameters to determine a probability of the pair of driving parameters. The grid table includes a number of mapping entries, each mapping entry mapping a particular pair of driving parameters to a probability associated with the grid cell. A ride stability score is calculated based on the probability of each pair of the driving parameters using a predetermined formula. An evaluation of the stability of an autonomous driving algorithm is performed by an autonomous driving system of the ADV based on the ride stability score.

FIG. 1 is a block diagram illustrating a network configuration according to one embodiment. Referring to FIG. 1, network configuration 100 includes a number of ADVs 101A-101C (collectively referred to as ADV 101) communicatively coupled to data analytics server 103 over network 102. Network 102 may be a wide area network (WAN) such as Internet, a local area network (LAN), or a combination thereof, wired or wireless. Server 103 may be a Web server, an application server, a backend server, or a cluster of servers. In one embodiment, each of ADVs 101 includes certain autonomous driving modules (e.g., perception, prediction, decision, planning, and/or control modules) responsible for autonomously driving the ADV. Such modules will be described in details further below.

In one embodiment, each of ADV 101 includes a data collector to collect driving statistics data obtained from various sensors and autonomous driving modules of the ADV. Driving statistics data may include perception data, prediction data, planning and control data for autonomously driving an ADV. For example, driving statistics data may include different control commands (e.g., throttle, brake, steering commands) issued at different points in time and the vehicle response or states (e.g., location, speed, acceleration) in response to the commands. The driving statistics data may further include path planning and speed planning data at each of the driving cycles, such as trajectories and speeds along the trajectory points of the trajectories. In one embodiment, driving statistics data include the speed, acceleration, jerk, curvature, changing rate of curvature at different points in time during the autonomous driving. These data are used for describing the motion status of a vehicle.

In order to acquire the driving statistics data, an inertial measurement unit (IMU) need to be installed at the testing vehicle that is used to collect the data. Note that, a testing vehicle does not have to be an ADV. A testing vehicle can be a regular vehicle having certain modules such as an IMU installed therein. The data collection process may be conducted by a human driver. There is no special requirement for a human driver and the driving behaviors. It is better to cover a few typical scenarios, such as city roads, rural roads, highway, rush hours, and/or different weather conditions. The data collection should be conducted for a long enough period of time.

Referring back to FIG. 1, according to one embodiment, data collector 111 is configured to collect driving statistics data (e.g., speed, acceleration, jerk, curvature, changing rate of curvature) from ADVs 101, either at real-time or as a part of previously recorded data downloaded from ADVs 101. Data analysis module 112 is configured to analyze the collected driving statistics data to drive a set of predetermined driving parameters (e.g., angular velocity, angular acceleration, longitudinal jerk, and lateral jerk). The grid table generator 113 is configured to plot a distribution graph of each of the driving parameters. For each of the driving parameters in the set, grid table generator 113 is configured to generate a grid table as a part of grid tables 114 based on the distribution graph corresponding to the driving parameter.

Figure 2:
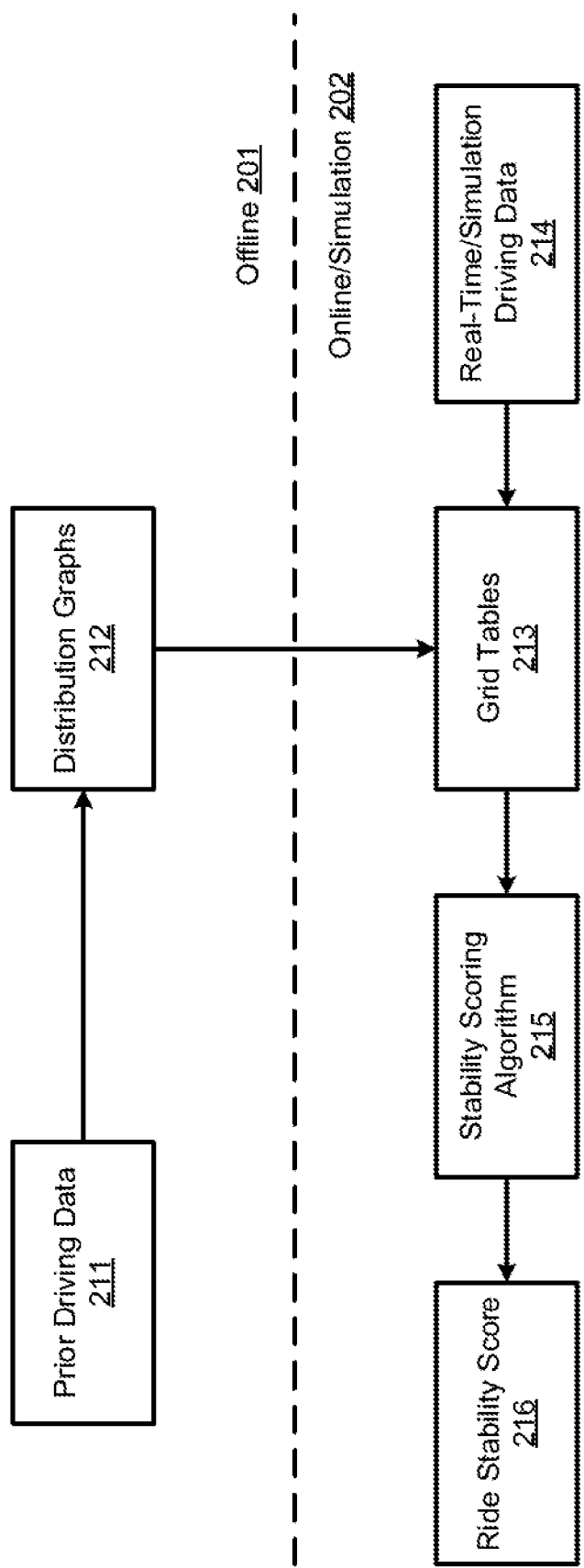
FIG. 2 is a diagram illustrating a processing flow of generating and utilizing grid tables according to one embodiment.

FIG. 2 is a block diagram illustrating a system architecture according to one embodiment. Referring to FIG. 2, the system architecture 200 includes two phases: offline 201 and online 202. During offline phase 201, previously captured driving statistics data 211 is analyzed to derive a set of predefined driving parameters. For each of the driving parameters, a distribution graph 212 is generated and a grid table 213 is generated for the corresponding driving parameter. In one embodiment, the grid tables 213 include a longitudinal jerk and angular velocity table having a plurality of mapping entries, each mapping entry mapping a particular pair of a longitudinal jerk and angular velocity to a particular probability. In another embodiment, the grid tables 213 include a lateral jerk and angular velocity table having a plurality of mapping entries, each mapping entry mapping a particular pair of a lateral jerk and angular velocity to a particular probability. In a further embodiment, the grid tables 213 include a longitudinal jerk and angular acceleration table having a plurality of mapping entries, each mapping entry mapping a particular pair of a longitudinal jerk and angular acceleration to a particular probability. In another embodiment, the grid tables 213 include a lateral jerk and angular acceleration table having a plurality of mapping entries, each mapping entry mapping a particular pair of a lateral jerk and angular acceleration to a particular probability.

Once the grid tables 213 have been created, during online or simulation phase 202, grid tables 213 can be utilized to determine a ride stability of an autonomous driving system. During online or simulation, a set of real-time data 214 is utilized to determine a set of driving parameters such as a longitudinal jerk, a lateral jerk, an angular velocity, and an angular acceleration. Based on the driving parameters, a lookup operation is performed in the grid tables 213 to determine the respective probabilities. A ride stability score 216 is then calculated using a stability scoring formula 215.

Figure 3A:
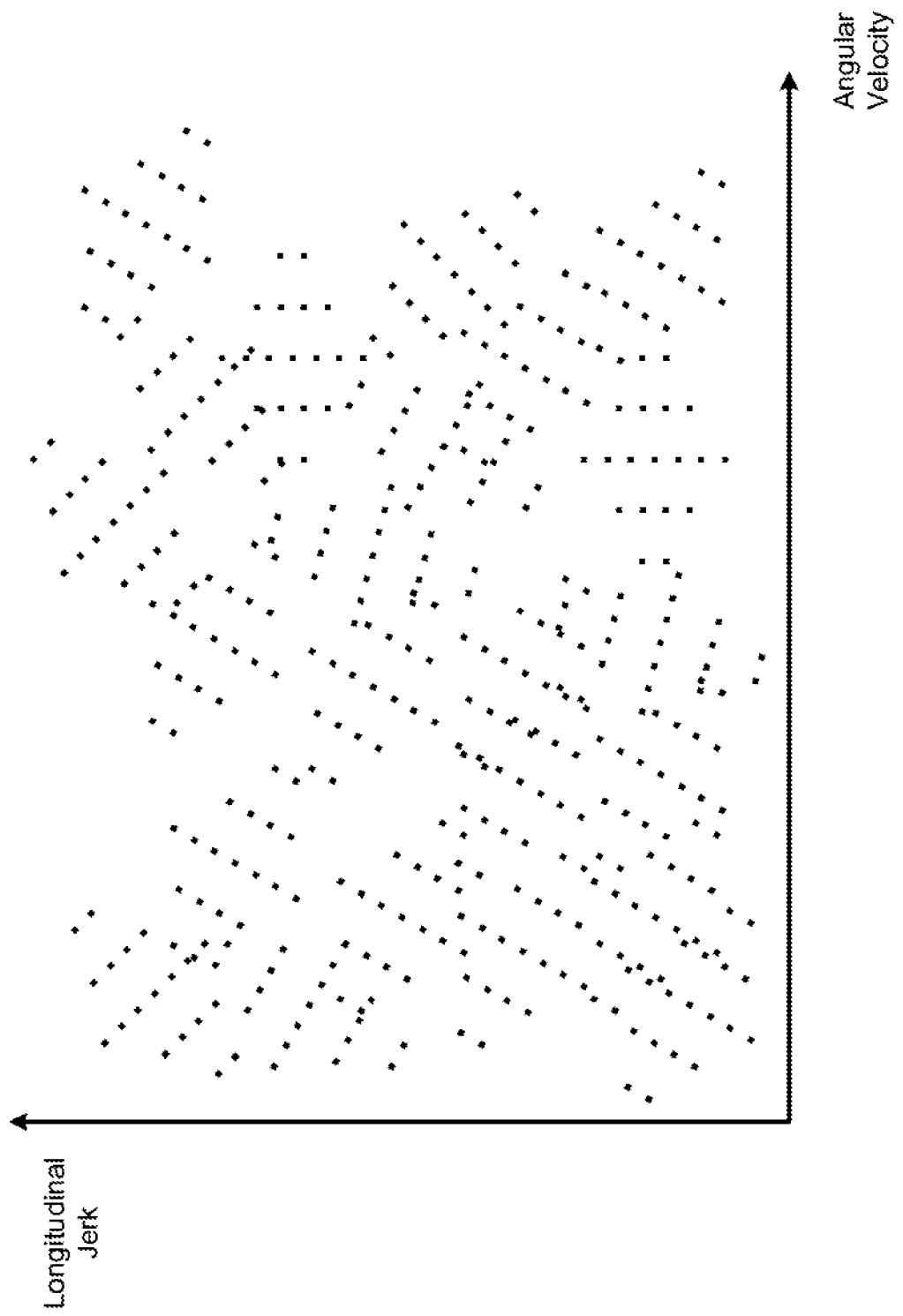

FIG. 3A is diagram illustrating an example of a longitudinal jerk and angular velocity distribution graph according to one embodiment. Referring to FIG. 3A, in this example, x axis represents angular velocity and y axis represents longitudinal jerk. Each of the data points represents a particular pair of longitudinal jerk and angular velocity with particular values. In one embodiment, the distribution graph is partitioned into a number of grid cells with a predetermined grid size as shown in FIG. 3B. Referring to FIG. 3B, for each of the grid cells, a probability is calculated based on the data points disposed within the grid cell in view of the total number of data points distributed in the 2D space as shown in FIG. 3A. For example, if the total number of data points is 100 and a particular grid cell has 10 data points, the probability for that particular grid cell is 10%. A grid table for a longitudinal jerk and angular velocity is generated based on the probabilities of the grid cells. An example of a grid table is shown in FIG. 4.

Referring to FIG. 4, grid table 400 includes a number of mapping entries. Each mapping entry maps a particular grid ID 401 to a probability 404. At real-time, when a set of driving parameters has been obtained, for each pair of the driving parameters, a first lookup is performed in the 2D distribution graph based on the values of driving parameters of the pair to determine which of the grid cells they belong. A grid cell ID is then obtained and a second lookup is performed in the grid table 400 based on the grid ID to obtain the probability.

Alternatively, each mapping entry maps a particular pair of longitudinal jerk 402 and angular velocity 403 to a particular probability 404. In this example, the values of the driving parameters of the pair are used as index in fields 402-403 to locate a matching entry to obtain the probability.v Note that grid table 400 is utilized as an example. Other types of grid tables such as a lateral jerk-angular velocity grid table, a longitudinal jerk-angular acceleration grid table, and a lateral jerk-angular acceleration grid table may be implemented similar to the one shown in FIG. 4.

Figure 5:
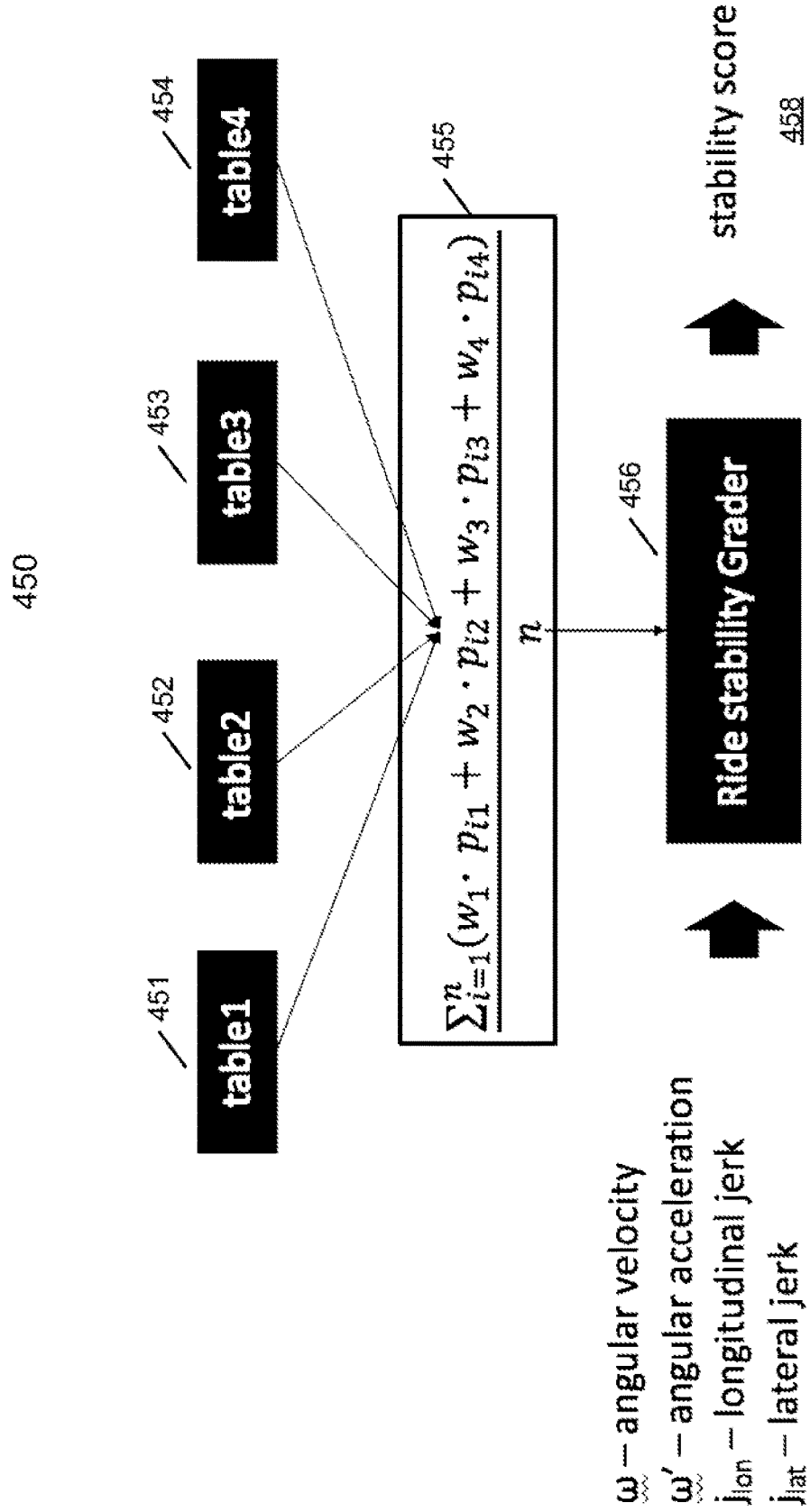
FIG. 5 is a block diagram illustrating a ride stability evaluation system according to one embodiment.

FIG. 5 is a block diagram illustrating an example of a stability scoring process according to one embodiment. System 450 may be implemented as a part of an ADV or an autonomous driving simulation system. Referring to FIG. 5, in this example, longitudinal jerk-angular velocity grid table 451, lateral jerk-angular velocity grid table 452, longitudinal jerk-angular acceleration grid table 453, and lateral jerk-angular acceleration grid table 454 have been generated using at least some of the techniques described above. Note that although four grid tables are shown, more or fewer grid tables or different kinds of grid tables of different driving parameters may also be applicable. Based on the grid tables 451-454, a ride stability scoring algorithm 455 may be utilized to calculate a ride stability score based on an input set of driving parameters 457.

In one embodiment, during the real-time autonomous driving or a simulated autonomous driving, a set of driving parameters 457 may be determined based on the planning and control data provided by an autonomous driving system of an ADV at real-time or a simulated autonomous driving system. In one embodiment, when a set of driving parameters has been determined, such as, angular velocity, angular acceleration, longitudinal jerk, and lateral jerk of parameter set 457, ride stability scoring module 456 is configured to perform a lookup operation in grid tables 451-454 based on the driving parameters 457 to determine the corresponding probabilities (represented by p1, p2, p3, and p4 in this example). Base on the probabilities obtained from grid tables 451-454, ride stability scoring algorithm 455 is utilized by ride stability scoring module 456 to calculate a ride stability score 458. In one embodiment, the probabilities are summed up with predetermined weights (e.g., w1, w2, w3, and w4). The overall stability score is calculated as the averaged value across the numbers of the data points.

Figure 6:
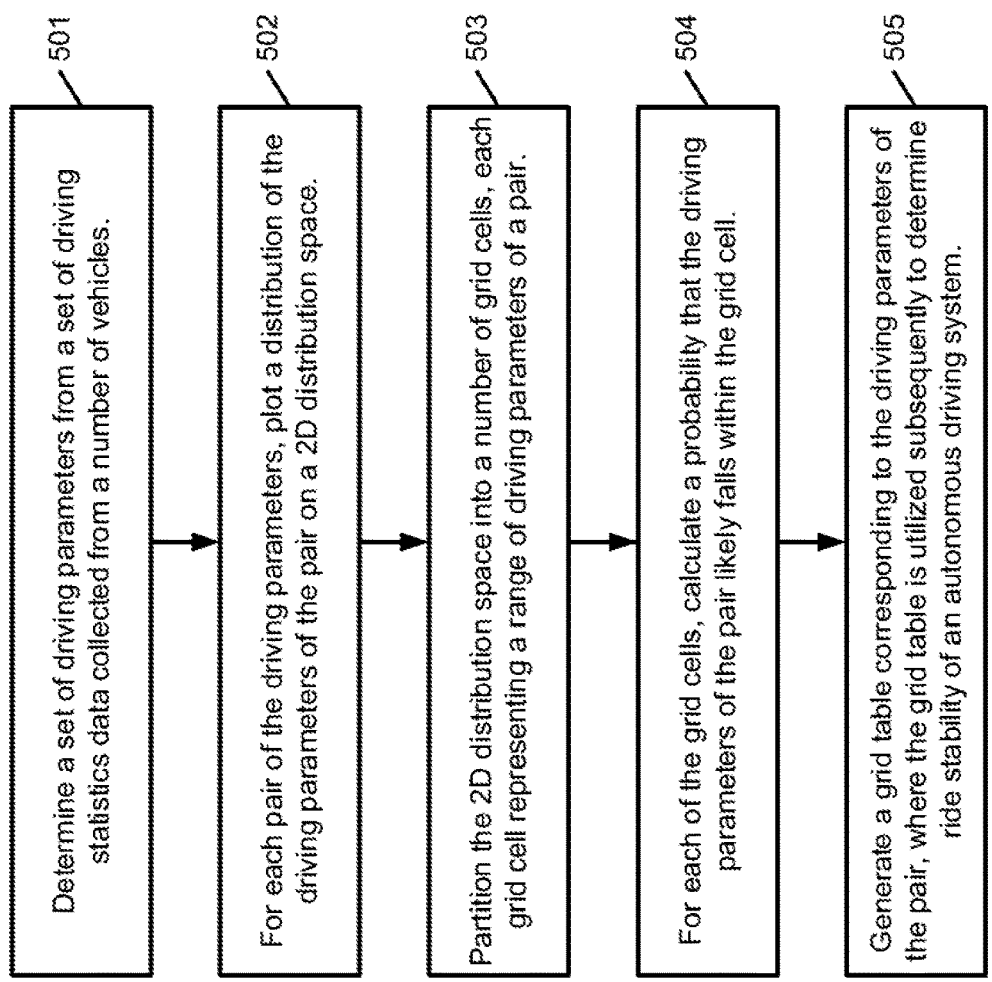
FIG. 6 is a flow diagram illustrating an example of a process for generating a grid table according to one embodiment.

FIG. 6 is a flow diagram illustrating a process of generating ride stability grid tables according to one embodiment. Process 600 may be performed by processing logic which may include software, hardware, or a combination thereof. For example, process 500 may be performed by server 103. Referring to FIG. 6, at block 501, processing logic determines a set of predetermined driving parameters from a set of driving statistics data collected from a number of vehicles. The driving statistics may include at least the speeds, accelerations, jerk, curvature, and derivative of curvature (e.g., changing rate of curvature). The driving parameters may include at least the angular velocity, angular acceleration, longitudinal jerk, and lateral jerk. For each pair of the driving parameters, at block 502, processing logic plots a distribution of the driving parameters of the pair on a two-dimensional (2D) distribution space in view of relationship between the driving parameters of the pair.

At block 503, processing logic partitions the 2D distribution space into a number of grid cells. Each grid cell represents a particular pair of particular driving parameters. At block 504, for each of the grid cells, processing logic calculates a probability that the driving parameters of the corresponding pair whose values likely falls within the range of the grid cell. At block 505, processing logic generates a grid table corresponding to the driving parameters of the pair. The grid table is utilized to determine a ride stability of an autonomous driving vehicle in view of the driving parameters of the pair.

Figure 7:
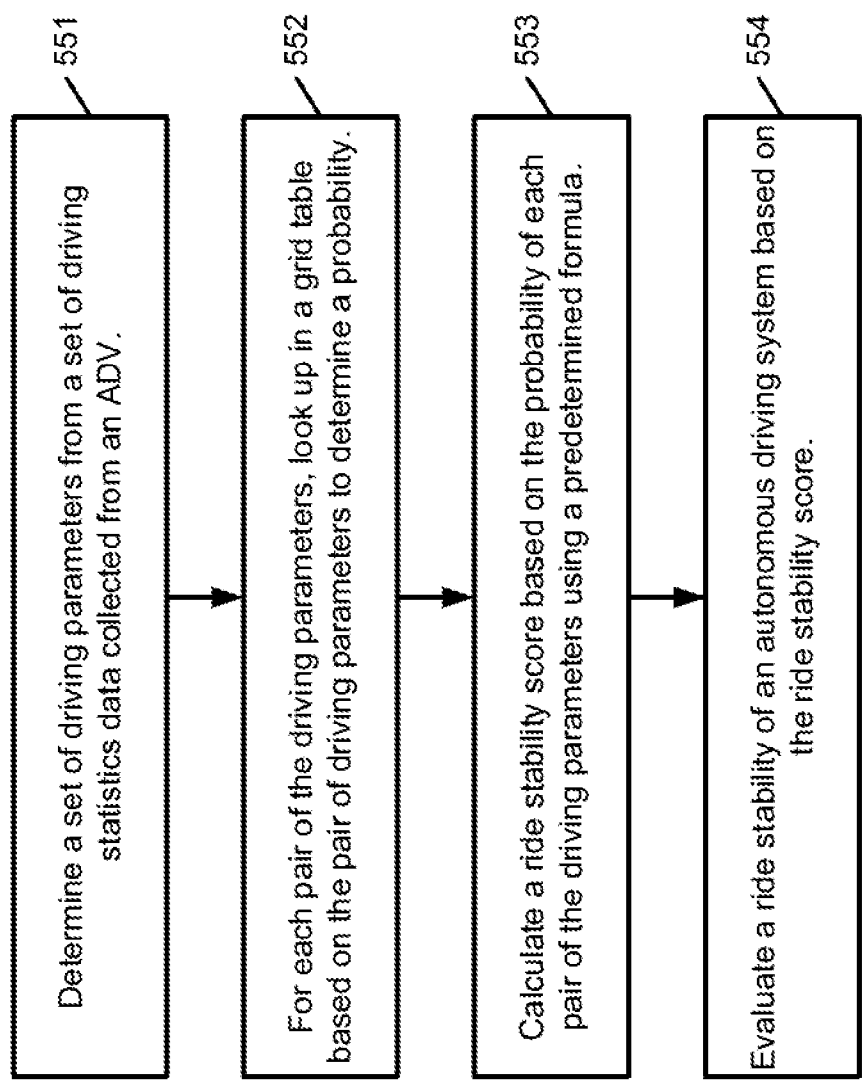
FIG. 7 is a flow diagram illustrating an example of a process for evaluating a ride stability of an autonomous driving system according to one embodiment.

FIG. 7 is a flow diagram illustrating an example of a process of determining a ride stability of an autonomous driving system according to one embodiment. Process 550 may be performed by processing logic which may include software, hardware, or a combination thereof. For example, process 550 may be performed by system 450 of FIG. 5. Referring to FIG. 7, at block 551, processing logic determines a set of driving parameters from a set of driving statistics data collected from an ADV or from an autonomous driving simulation system. At block 552, for each pair of the driving parameters, processing logic performs a lookup operation based on the pair of driving parameters in a grid table associated with the pair of driving parameters to determine a probability of the pair of driving parameters. The grid table includes a number of mapping entries. Each mapping entry maps a particular pair of driving parameters to a probability associated with the grid cell. At block 553, processing logic calculates a ride stability score based on the probability of each pair of the driving parameters using a predetermined formula. At block 554, processing logic evaluates a ride stability of an autonomous driving algorithm performed by an autonomous driving system of the ADV base on the ride stability score.

Figure 8:
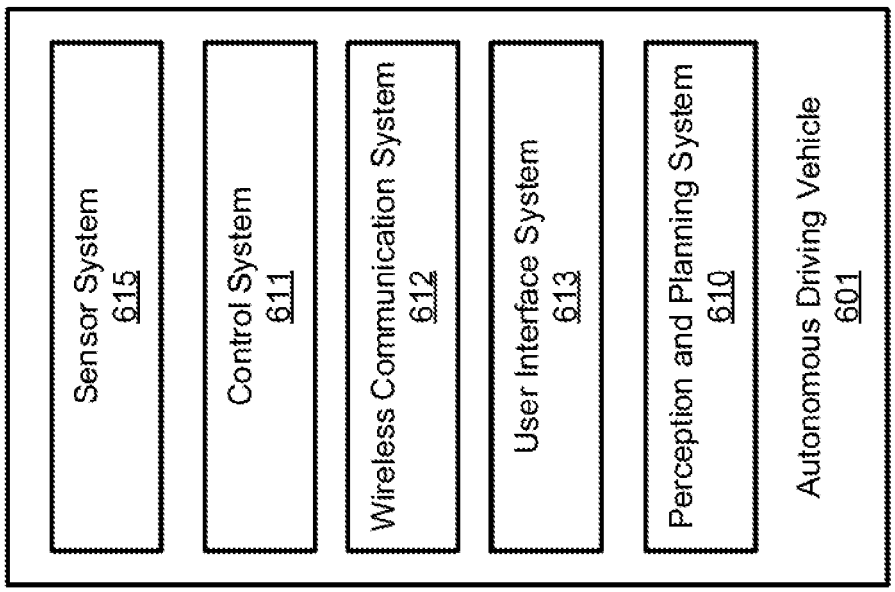
FIG. 8 is a block diagram illustrating an autonomous driving vehicle according to one embodiment.

FIG. 8 is a block diagram illustrating an autonomous driving vehicle according to one embodiment of the disclosure. Referring to FIG. 8, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, perception and planning system 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 9:
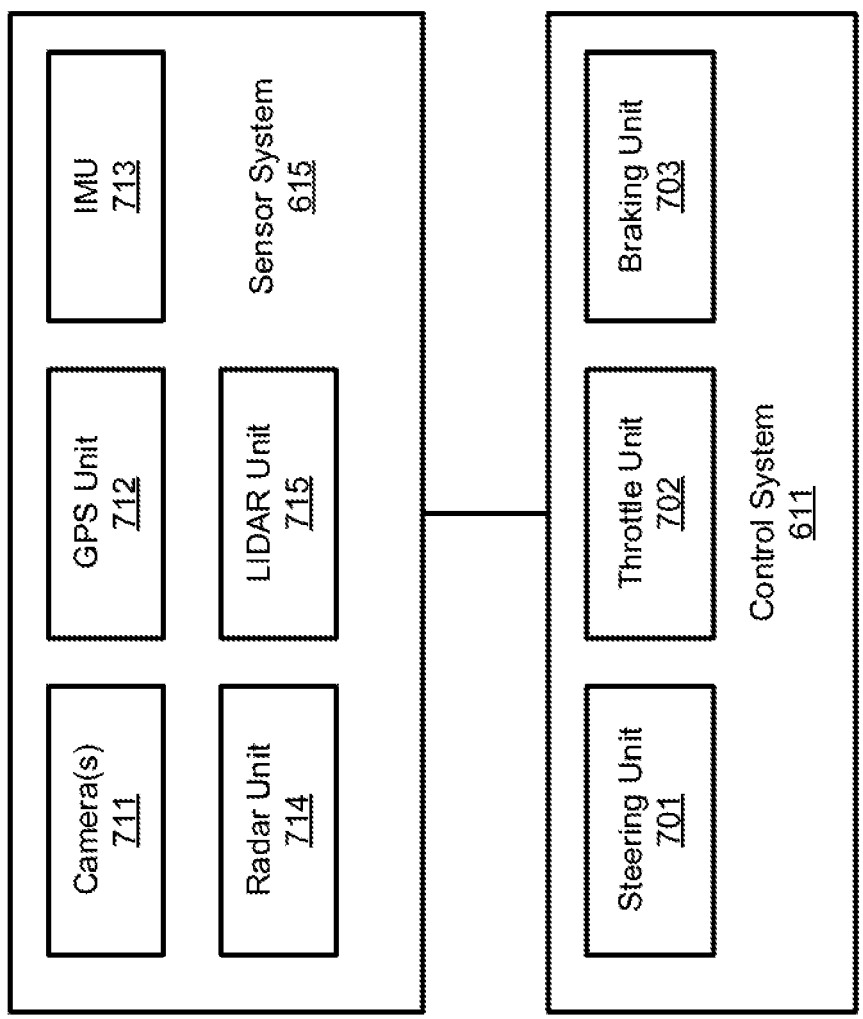
FIG. 9 is a block diagram illustrating an example of an autonomous driving vehicle according to one embodiment.

Referring now to FIG. 9, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 9 may be implemented in hardware, software, or a combination thereof.

Referring back to FIG. 8, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601 is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 10:
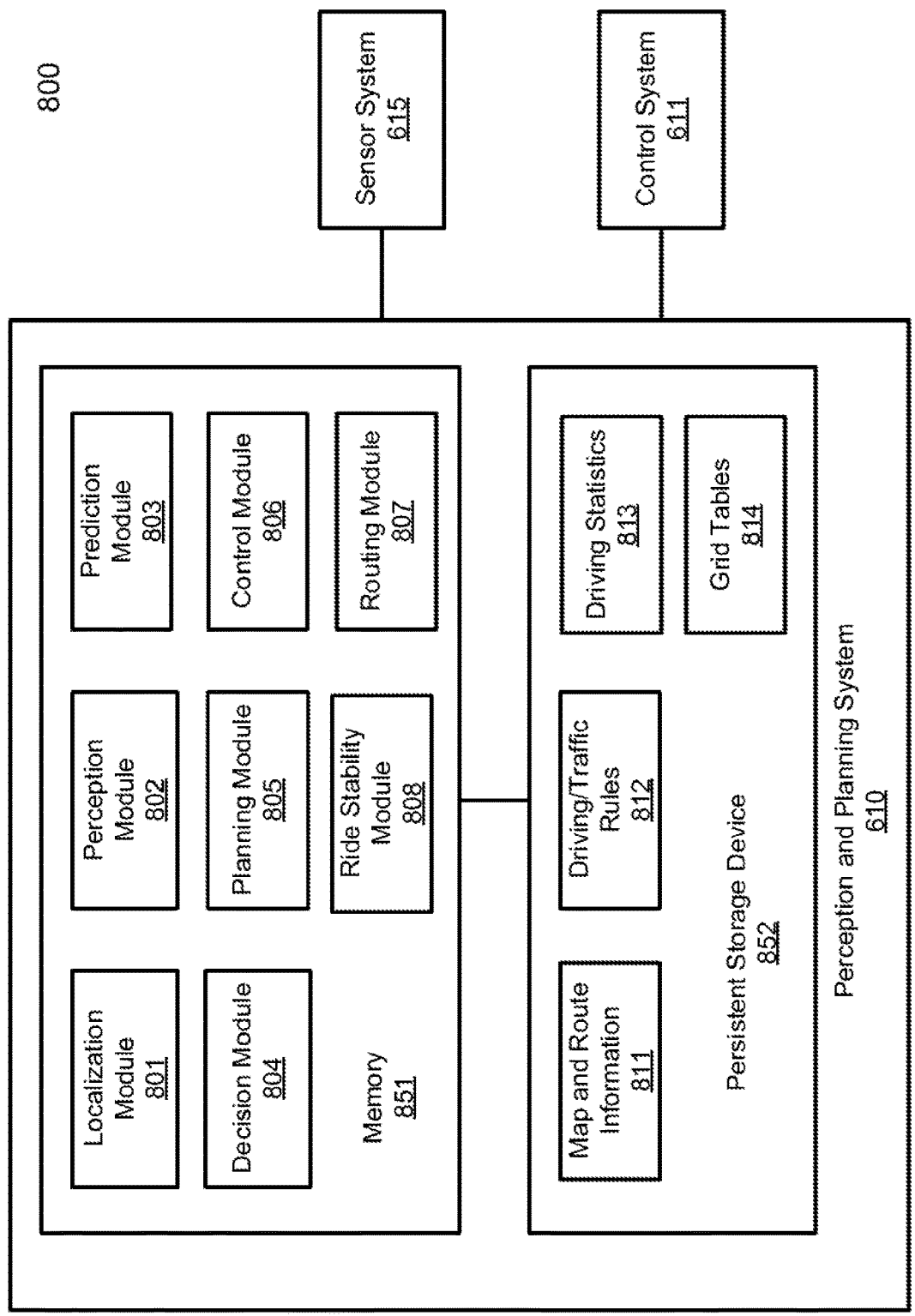
FIG. 10 is a block diagram illustrating an example of a perception and planning system used with an autonomous driving vehicle according to one embodiment.

FIG. 10 is a block diagram illustrating an example of a perception and planning system used with an autonomous driving vehicle according to one embodiment. System 800 may be implemented as a part of autonomous driving vehicle 601 of FIG. 8 including, but is not limited to, perception and planning system 610, control system 611, and sensor system 615. Referring to FIG. 10, perception and planning system 610 includes, but is not limited to, localization module 801, perception module 802, prediction module 803, decision module 804, planning module 805, control module 806, routing module 807, and ride stability module 808.

Some or all of modules 801-808 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 9. Some of modules 801-808 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

Ride stability module 808 may be implemented as a part of the ride stability evaluation system as shown in FIG. 5. In one embodiment, ride stability module 808 determines a set of driving parameters from the driving statistics 813 collected during the autonomous driving. The driving statistics 813 include speed, acceleration, jerk, curvature, and derivative of curvature of the ADV captured at different points in time. The driving parameters include longitudinal jerk, lateral jerk, angular velocity, and angular acceleration. Base on the driving parameters, ride stability module 808 calculates a ride stability score using the corresponding grid tables 814 as described above.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   determining a set of predetermined driving parameters from a set of driving statistics data collected from a plurality of vehicles; and
   for each pair of the predetermined driving parameters,
      plotting a distribution of the driving parameters in view of a relationship between two predetermined driving parameters of the pair on a two-dimensional (2D) distribution space,
      partitioning the 2D distribution space into a plurality of grid cells, each grid cell representing a particular relationship of the pair of driving parameters,
      for each of the grid cells, calculating a probability that the driving parameters of the pair likely falls in the grid cell, and
      generating a grid table corresponding to a category of the driving parameters of the pair, wherein the grid table is utilized to determine a driving stability of an autonomous driving vehicle (ADV) in view of the driving parameters of the category, and wherein the driving stability of the ADV is used to improve a development efficiency of an autonomous driving system of the ADV.

2. The method of claim 1, wherein the grid table comprises a plurality of mapping entries, each mapping entry mapping a grid identifier (ID) identifying a particular grid cell to a probability representing a likelihood that a particular pair of driving parameters falls into that particular grid cell.

3. The method of claim 1, wherein categories of the driving statistics data comprise at least one of a speed, an acceleration, a jerk, a curvature, or a curvature changing rate.

4. The method of claim 1, wherein the set of driving parameters comprise at least one of an angular velocity, an angular acceleration, a longitudinal jerk, or a lateral jerk.

5. The method of claim 1, wherein the grid table comprises a longitudinal jerk and angular velocity table having a plurality of mapping entries, each mapping entry mapping a particular pair of a longitudinal jerk and angular velocity to a particular probability.

6. The method of claim 1, wherein the grid table comprises a lateral jerk and angular velocity table having a plurality of mapping entries, each mapping entry mapping a particular pair of a lateral jerk and angular velocity to a particular probability.

7. The method of claim 1, wherein the grid table comprises a longitudinal jerk and angular acceleration table having a plurality of mapping entries, each mapping entry mapping a particular pair of a longitudinal jerk and angular acceleration to a particular probability.

8. The method of claim 1, wherein the grid table comprises a lateral jerk and angular acceleration table having a plurality of mapping entries, each mapping entry mapping a particular pair of a lateral jerk and angular acceleration to a particular probability.

9. A non-transitory machine-readable medium having instructions stored therein, which when executed by a processor, cause the processor to perform operations, the operations comprising:
   determining a set of predetermined driving parameters from a set of driving statistics data collected from a plurality of vehicles; and
   for each pair of the predetermined driving parameters,
      plotting a distribution of the driving parameters in view of a relationship between two predetermined driving parameters of the pair on a two-dimensional (2D) distribution space,
      partitioning the 2D distribution space into a plurality of grid cells, each grid cell representing a particular relationship of the pair of driving parameters,
      for each of the grid cells, calculating a probability that the driving parameters of the pair likely falls in the grid cell, and
      generating a grid table corresponding to a category of the driving parameters of the pair, wherein the grid table is utilized to determine a driving stability of an autonomous driving vehicle (ADV) in view of the driving parameters of the category, and wherein the driving stability of the ADV is used to improve a development efficiency of an autonomous driving system of the ADV.

10. The machine-readable medium of claim 9, wherein the grid table comprises a plurality of mapping entries, each mapping entry mapping a grid identifier (ID) identifying a particular grid cell to a probability representing a likelihood that a particular pair of driving parameters falls into that particular grid cell.

11. The machine-readable medium of claim 9, wherein categories of the driving statistics data comprise at least one of a speed, an acceleration, a jerk, a curvature, or a curvature changing rate.

12. The machine-readable medium of claim 9, wherein the set of driving parameters comprise at least one of an angular velocity, an angular acceleration, a longitudinal jerk, or a lateral jerk.

13. The machine-readable medium of claim 9, wherein the grid table comprises a longitudinal jerk and angular velocity table having a plurality of mapping entries, each mapping entry mapping a particular pair of a longitudinal jerk and angular velocity to a particular probability.

14. The machine-readable medium of claim 9, wherein the grid table comprises a lateral jerk and angular velocity table having a plurality of mapping entries, each mapping entry mapping a particular pair of a lateral jerk and angular velocity to a particular probability.

15. The machine-readable medium of claim 9, wherein the grid table comprises a longitudinal jerk and angular acceleration table having a plurality of mapping entries, each mapping entry mapping a particular pair of a longitudinal jerk and angular acceleration to a particular probability.

16. The machine-readable medium of claim 9, wherein the grid table comprises a lateral jerk and angular acceleration table having a plurality of mapping entries, each mapping entry mapping a particular pair of a lateral jerk and angular acceleration to a particular probability.

17. A computer-implemented method, comprising:
   determining a set of driving parameters from driving statistics data collected from an autonomous driving vehicle (ADV) or from an autonomous simulation system;
   for each pair of the driving parameters, performing a lookup operation based on the pair of driving parameters in a grid table associated with the pair of driving parameters to determine a probability of the pair of driving parameters, wherein the grid table includes a plurality of grid cells, each grid cell mapping a particular pair of driving parameters to a probability associated with the grid cell;

calculating a ride stability score based on the probability of each pair of the driving parameters using a predetermined formula; and evaluating a stability of an autonomous driving algorithm performed by an autonomous driving system of the ADV based on the ride stability score, and wherein the driving stability of the ADV is used to improve a development efficiency of the autonomous driving system of the ADV.

18. The method of claim 17, wherein categories of the driving statistics data comprise at least one of a speed, an acceleration, a jerk, a curvature, or a curvature changing rate, and wherein the set of driving parameters comprise at least one of an angular velocity, an angular acceleration, a longitudinal jerk, or a lateral jerk.

19. The method of claim 17, wherein the grid table comprises a longitudinal jerk and angular velocity table having a plurality of mapping entries, each mapping entry mapping a particular pair of a longitudinal jerk and angular velocity to a particular probability.

20. The method of claim 17, wherein the grid table comprises a lateral jerk and angular velocity table having a plurality of mapping entries, each mapping entry mapping a particular pair of a lateral jerk and angular velocity to a particular probability.

21. The method of claim 17, wherein the grid table comprises a longitudinal jerk and angular acceleration table having a plurality of mapping entries, each mapping entry mapping a particular pair of a longitudinal jerk and angular acceleration to a particular probability.

22. The method of claim 17, wherein the grid table comprises a lateral jerk and angular acceleration table having a plurality of mapping entries, each mapping entry mapping a particular pair of a lateral jerk and angular acceleration to a particular probability.

* * * * *